United States Patent
Ueki et al.

(10) Patent No.: US 9,663,673 B2
(45) Date of Patent: May 30, 2017

(54) INK, RECORDING DEVICE, AND RECORDING METHOD

(71) Applicant: FUJI XEROX CO., LTD., Tokyo (JP)

(72) Inventors: Hiroyuki Ueki, Kanagawa (JP); Mami Hatanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/040,226

(22) Filed: Feb. 10, 2016

(65) Prior Publication Data

US 2016/0272829 A1    Sep. 22, 2016

(30) Foreign Application Priority Data

Mar. 19, 2015 (JP) ................. 2015-056615

(51) Int. Cl.
*C09D 11/326* (2014.01)
*C09D 11/324* (2014.01)
*C09D 11/106* (2014.01)

(52) U.S. Cl.
CPC .......... *C09D 11/326* (2013.01); *C09D 11/106* (2013.01); *C09D 11/324* (2013.01)

(58) Field of Classification Search
CPC ... C09D 11/326; C09D 11/324; C09D 11/107; C09D 11/102; B41J 2/01
See application file for complete search history.

(56) References Cited

U.S. PATENT DOCUMENTS

| | | | |
|---|---|---|---|
| 2009/0033730 A1* | 2/2009 | Shino | B41M 5/00 347/102 |
| 2009/0233061 A1* | 9/2009 | Irita | B41J 11/0015 428/195.1 |
| 2013/0307912 A1 | 11/2013 | Masuda et al. | |

FOREIGN PATENT DOCUMENTS

JP    2013-256108 A    12/2013

* cited by examiner

*Primary Examiner* — Alessandro Amari
*Assistant Examiner* — Roger W Pisha, II
(74) *Attorney, Agent, or Firm* — Oliff PLC

(57) ABSTRACT

An ink includes pigment particles, polymer particles in such an amount that a total volume thereof is from 0.3 to 1.6 when a total volume of the pigment particles is taken as 1, water, and an aqueous organic solvent.

15 Claims, 1 Drawing Sheet

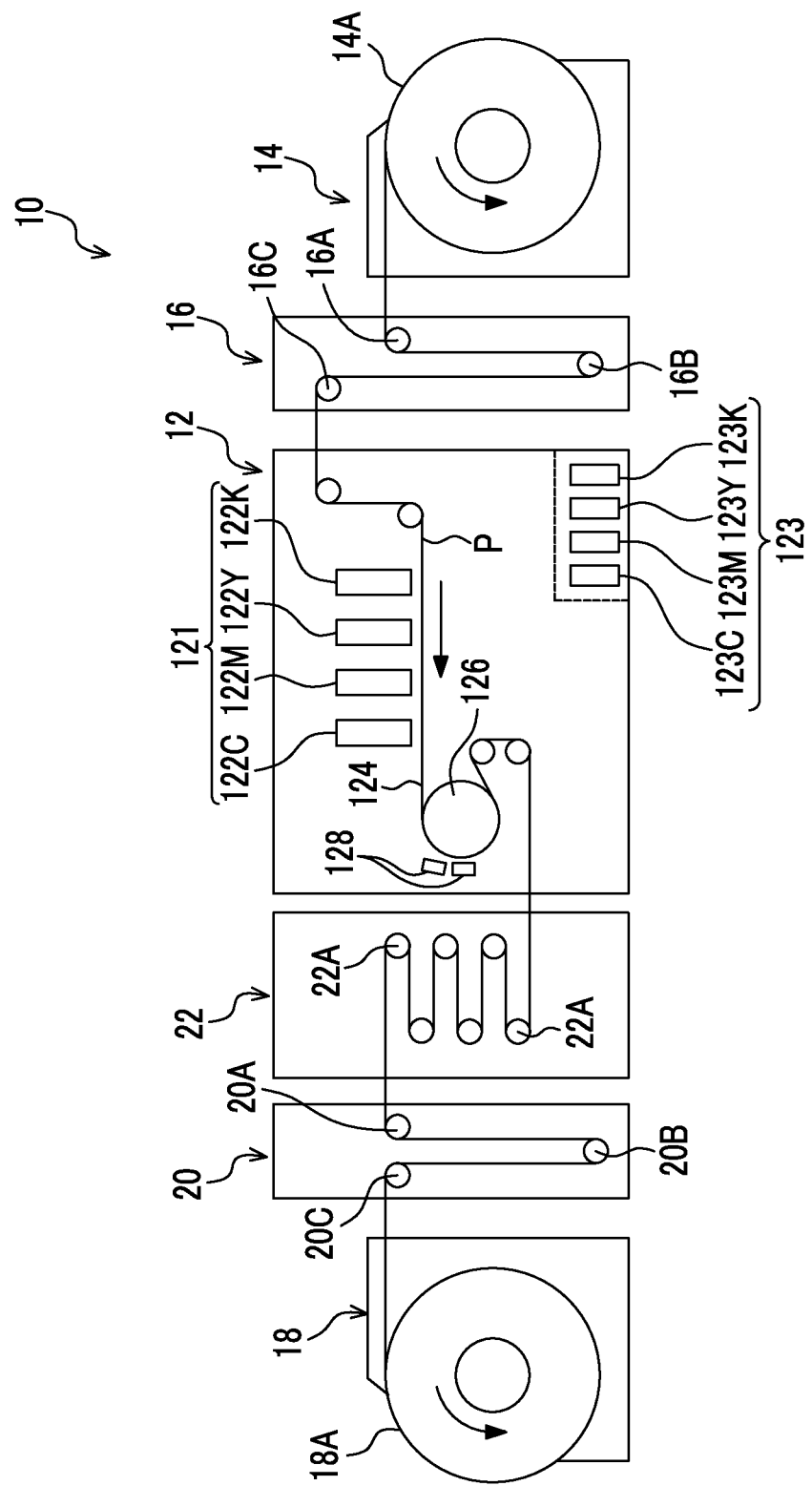

INK, RECORDING DEVICE, AND RECORDING METHOD

CROSS-REFERENCE TO RELATED APPLICATIONS

This application is based on and claims priority under 35 USC 119 from Japanese Patent Application No. 2015-056615 filed Mar. 19, 2015.

BACKGROUND

Technical Field

The present invention relates to an ink, a recording device, and a recording method.

SUMMARY

According to an aspect of the invention, there is provided an ink including:
pigment particles;
polymer particles in such an amount that a total volume thereof is from 0.3 to 1.6 when a total volume of the pigment particles is taken as 1;
water; and
an aqueous organic solvent.

BRIEF DESCRIPTION OF THE DRAWINGS

Exemplary embodiments of the present invention will be described in detail based on the following FIGURE, wherein:

FIG. 1 is a schematic diagram illustrating a recording device according to an exemplary embodiment.

DETAILED DESCRIPTION

Hereinafter, an ink, an ink cartridge, a recording device, and a recording method according to an exemplary embodiment of the invention will be described.

Ink

An ink according to this exemplary embodiment contains: pigment particles, polymer particles used in such an amount that a total volume thereof is 0.3 to 1.6 when a total volume of the pigment particles is taken as 1, water, and an aqueous organic solvent.

Due to such a configuration, the ink according to this exemplary embodiment is made to reduce a deviation of a landing position, and to prevent the transfer of an image recorded on a recording medium to an object coming into contact with the image.

An image recorded on a recording medium comes into contact with various objects in many cases, for example, when it overlaps with another recording medium, overlap with a resin film, or is sandwiched between clips. Therefore, techniques of preventing the transfer of the image recorded on the recording medium to an object coming into contact with the image are currently required.

Crimped postcards having recording information concealing properties are known as a kind of pressure bonding paper provided with a pressure-sensitive adhesive layer on at least one surface of a base.

In the case of the crimped postcards, an image is recorded on the pressure-sensitive adhesive layer, the postcard is folded in two (V-shape) or three (Z-shape) such that the surface on which the image is recorded is in the inside, and then the surfaces opposed to each other are pressure-bonded to conceal the recorded image.

That is, the crimped postcards have such a form that the recorded image necessarily comes into contact with (is pressure-bonded to) an object (a part of the postcard).

Particularly, in the case of crimped postcards for ink jet recording among the crimped postcards described above, the pressure-sensitive adhesive layer provided on a base also functions as an ink receiving layer which receives an ink discharged by ink jet recording.

When an ink is discharged by ink jet recording on the pressure-sensitive adhesive layer which also functions as an ink receiving layer as described above, the landed ink permeates through the pressure-sensitive adhesive layer, and is dried, and thus an image is recorded. Then, a pressure bonding treatment is performed to prepare a crimped postcard (after printing).

However, when a conventional ink is used, the recorded image (ink) may be transferred to a surface opposed thereto when a pressure-bonded portion of the crimped postcard after printing is detached.

In the ink according to this exemplary embodiment, polymer particles are dispersed together with pigment particles in a water dispersion medium containing a water-soluble organic solvent and water. That is, the pigment particles and the polymer particles dispersed in the water dispersion medium have a hydrophilic surface.

When the ink according to this exemplary embodiment is discharged on a recording medium, the pigment particles and the polymer particles are more likely to be adjacent to each other in ink droplets landed on the recording medium since these are hydrophilic particles. In addition to this, the polymer particles have a smaller specific gravity than the pigment particles, and thus in the ink droplets landed on the recording medium, the pigment particles are disposed on the recording medium side, and the polymer particles are disposed on the upper side of the pigment particles, that is, on the surface side of the ink droplets.

The polymer particles disposed on the surface side of the ink droplets may form a layer which is formed by aggregation of the polymer particles, or a layer which is formed by self fusion of at least a part of the polymer particles. When the layer formed of the polymer particles (hereinafter, referred to as "polymer layer") exists on the top of the pigment particles, it is thought that the adhesive strength of the image formed of the pigment particles with respect to an object coming into contact with the image (surface opposed to the image, in the case of a crimped postcard) may be reduced.

Accordingly, due to the presence of the polymer layer, the image recorded with the ink according to this exemplary embodiment on a recording medium may be prevented from being transferred to an object coming into contact with the image. Particularly, the effect of reducing the adhesive strength between the image and the object, obtained due to the above-described presence of the polymer layer, also functions even when the recorded image (image formed of pigment particles) and the object are pressure-bonded. Therefore, the image recorded on a pressure-sensitive adhesive layer of pressure bonding paper such as a crimped postcard may be prevented from being transferred to a surface opposed thereto even when a pressure-bonded portion is detached after pressure bonding.

The polymer particles contained in the ink function to form a polymer layer as described above, but when an amount thereof is too large, nozzle clogging easily occurs in a discharge head which discharges the ink, and results in a reduction in the discharge properties of the ink. As a result, when the ink is discharged after a pause period (for example, 0.003 seconds to 1 second) from the previous ink discharge (for example, when an image having a low image density is recorded), a so-called deviation of a landing position in which a landing position of the ink deviates from a target position occurs.

The inventors have found that by specifying the content of the polymer particles by a ratio of the total volume of the polymer particles with respect to the total volume of the pigment particles, a polymer layer which may prevent a reduction in the discharge properties of the ink caused by the content of the polymer particles, and may reduce the adhesive strength of an image formed of the pigment particles with respect to a surface opposed to the image is formed.

That is, in the ink according to this exemplary embodiment, when the content of the polymer particles is specified such that a total volume of the polymer particles is 0.3 to 1.6 when a total volume of the pigment particles is taken as 1, a reduction in the discharge properties is prevented, a deviation of a landing position is reduced, and a polymer layer, which reduces the adhesive strength of an image formed of the pigment particles with respect to an object coming into contact with the image, is formed, thereby preventing the image from being transferred to the object coming into contact with the image.

Hereinafter, the composition and characteristics of the ink according to this exemplary embodiment will be described in detail.

The ink according to this exemplary embodiment contains pigment particles, polymer particles, water, and an aqueous organic solvent.

Pigment Particles

First, pigment particles will be described.

A pigment according to an ink having a target color may be used as the pigment particles. As the pigment, any of an organic pigment and an inorganic pigment is used.

Specific examples of a black pigment include, but are not limited to, Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080, and Raven 1060 (all manufactured by Columbian Carbon Company), Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (all manufactured by Cabot Corporation), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (all manufactured by Orion Engineered Carbons), No. 25, No. 33, No. 40, No. 47, No. 52, No. 900, No. 2300, MCF-88, MA 600, MA7, MA8, and MA 100 (all manufactured by Mitsubishi Chemical Corporation).

Specific examples of a cyan pigment include, but are not limited to, C.I.Pigment Blue-1, -2, -3, -15, -15:1, -15:2, -15:3, -15:4, -16, -22, and -60.

Specific examples of a magenta pigment include, but are not limited to, C.I.Pigment Red-5, -7, -12, -48, -48:1, -57, -112, -122, -123, -146, -168, -177, -184, and -202, and C.I.Pigment Violet-19.

Specific examples of a yellow pigment include, but are not limited to, C.I.Pigment Yellow-1, -2, -3, -12, -13, -14, -16, -17, -73, -74, -75, -83, -93, -95, -97, -98, -114, -128, -129, -138, -151, -154, and -180.

In the ink according to this exemplary embodiment, a pigment dispersant is preferably used along with the pigment (particles). Examples of the pigment dispersant to be used include a polymer dispersant, an anionic surfactant, a cationic surfactant, an amphoteric surfactant, and a nonionic surfactant.

As the polymer dispersant, a polymer having a hydrophilic structure portion and a hydrophobic structure portion is preferably used. For example, a condensation polymer and an addition polymer are used as the polymer having a hydrophilic structure portion and a hydrophobic structure portion. Examples of the condensation polymer include known polyester dispersants. Examples of the addition polymer include an addition polymer of a monomer having a α,β-ethylenic unsaturated group. A target polymer dispersant is obtained by combining and copolymerizing a monomer having a α,β-ethylenic unsaturated group having a hydrophilic group and a monomer having a α,β-ethylenic unsaturated group having a hydrophobic group. In addition, a homopolymer of a monomer having a α,β-ethylenic unsaturated group having a hydrophilic group is also used.

Examples of the monomer having a α,β-ethylenic unsaturated group having a hydrophilic group include monomers having carboxyl groups, sulfonate groups, hydroxyl groups, or phosphate groups such as acrylic acid, methacrylic acid, crotonic acid, itaconic acid, itaconate monoester, maleic acid, maleate monoester, fumaric acid, fumarate monoester, vinylsulfonic acid, styrenesulfonic acid, sulfonated vinyl naphthalene, vinyl alcohol, acrylamide, methacryloxy ethyl phosphate, bismethacryloxy ethyl phosphate, methacryloxy ethyl phenyl acid phosphate, ethylene glycol dimethacrylate, and diethylene glycol dimethacrylate.

Examples of the monomer having a α,β-ethylenic unsaturated group having a hydrophobic group include styrene derivatives such as styrene, α-methyl styrene, and vinyl toluene, vinyl cyclohexane, vinyl naphthalene, vinyl naphthalene derivatives, alkyl acrylate ester, alkyl methacrylate ester, phenyl methacrylate ester, cycloalkyl methacrylate ester, alkyl crotonate ester, dialkyl itaconate ester, and dialkyl maleate ester.

Examples of the copolymer which is preferable as the polymer dispersant include a styrene-styrenesulfonic acid copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinylnaphthalene-acrylic acid copolymer, an alkyl acrylate ester-acrylic acid copolymer, an alkyl methacrylate ester-methacrylic acid copolymer, a styrene-alkyl methacrylate ester-methacrylic acid copolymer, a styrene-alkyl acrylate ester-acrylic acid copolymer, a styrene-phenyl methacrylate ester-methacrylic acid copolymer, and a styrene-cyclohexyl methacrylate ester-methacrylic acid copolymer. These polymers may be copolymerized with a monomer having a polyoxyethylene group or a hydroxyl group.

The weight average molecular weight of the polymer dispersant may be, for example, 2,000 to 50,000.

These polymer dispersants may be used alone or in combination of two or more kinds. The content of the polymer dispersant may be 0.1% by weight to 100% by weight with respect to the pigment, although not necessarily accurate since the content greatly varies with the pigment.

The pigment may be a pigment (hereinafter, referred to as self-dispersion type pigment) which is self-dispersed in water.

The self-dispersion type pigment is a pigment which has, on a pigment surface thereof, a group that is soluble in water, and is self-dispersed in water even when the polymer dispersant does not exist. The self-dispersion type pigment is obtained by subjecting the pigment to a surface modification treatment such as an acid-base treatment, a coupling agent treatment, a polymer graft treatment, a plasma treatment, or an oxidation/reduction treatment.

Examples of the self-dispersion type pigment include, in addition to pigments obtained by subjecting the pigment to a surface modification treatment, Cab-o-jet-200, Cab-o-jet-300, Cab-o-jet-400, IJX-157, IJX-253, IJX-266, IJX-273, IJX-444, IJX-55, Cab-o-jet-250C, Cab-o-jet-260M, Cab-o-jet-270Y, Cab-o-jet-450C, Cab-o-jet-465M, Cab-o-jet-470Y, and Cab-o-jet-480M manufactured by Cabot Corporation, and Microjet Black CW-1 and CW-2 manufactured by Orient Chemical Industries, Ltd.

The self-dispersion type pigment is preferably a pigment having at least a sulfonic acid, a sulfonate, a carboxylic acid, or a carboxylate as a functional group on a surface thereof. A pigment having at least a carboxylic acid or a carboxylate as a functional group on a surface thereof is more preferable.

As the pigment, a pigment coated with a resin is also exemplified. This is called microcapsule pigment, and examples thereof include commercially available microcapsule pigments manufactured by DIC Corporation or Toyo Ink SC Holdings Co., Ltd. The microcapsule pigment is not limited to commercially available microcapsule pigments, and microcapsule pigments prepared according to the purpose may be used.

As the pigment, a resin dispersion type pigment in which a polymer compound is physically adsorbed to or chemically coupled to the pigment is also exemplified.

Examples of the pigment also include, in addition to pigments of black and three primary colors of cyan, magenta, and yellow, pigments of specific colors of red, green, blue, brown, and white, pigments of metallic lusters of gold and silver, extender pigments being colorless or having a pale color, fluorescent pigments, and plastic pigments are also exemplified.

As the pigment, particles in which silica, alumina, or polymer beads are used as cores, and pigments are fixed to surfaces thereof, a colored emulsion, and colored latex are also exemplified.

The volume average particle diameter of the pigment particles may be, for example, 10 nm to 1,000 nm, and is preferably 20 nm to 500 nm, and more preferably 50 nm to 200 nm.

The volume average particle diameter of the pigment particles refers to a diameter of the pigment particle itself, or a diameter of the pigment particle with an additive attached thereto when the additive such as a dispersant is attached to the pigment particles.

The volume average particle diameter is measured by a Microtrac UPA particle size analyzer UPA-UT151 (manufactured by Microtrac). The measurement is performed by putting an ink diluted 1,000 times into a measurement cell. As input values at the time of the measurement, viscosity of the diluted solution of the ink is employed as the viscosity, and a refractive index of the pigment particles is employed as the particle refractive index.

In the ink according to this exemplary embodiment, the content (concentration) of the pigment particles is, for example, preferably 1% by weight to 25% by weight, more preferably 2% by weight to 20% by weight, and even more preferably 3% by weight to 10% by weight with respect to the ink.

In the ink according to this exemplary embodiment, other than the pigment (particles), a dye or the like may be used as a colorant in combination in order to adjust the color.

Examples of the colorant other than the pigment include: dyes such as hydrophilic anionic dyes, direct dyes, cationic dyes, reactive dyes, polymer dyes, and oil-soluble dyes; wax powders, resin powders, or emulsions colored with a dye; and fluorescent dyes.

The colorant other than the pigment is preferably used in an amount of 5% by weight or less with respect to the pigment.

Polymer Particles

Polymer particles will be described.

The polymer particles are a component which increases the fixing properties of an ink image, and forms a polymer layer.

The polymer particles of this exemplary embodiment are contained in the ink in such an amount that a total volume thereof is 0.3 to 1.6, preferably 0.4 to 1.5, and more preferably 0.6 to 1.3 when a total volume of the pigment particles is taken as 1.

In the case in which the total volume of the polymer particles is less than 0.3 when the total volume of the pigment particles is 1, the ink has good discharge properties and a deviation of a landing position is reduced, but the recorded image is transferred to an object coming into contact with the image. In the case in which the total volume of the polymer particles is greater than 1.6 when the total volume of the pigment particles is 1, the transfer of the recorded image to an object coming into contact with the image is prevented, but the discharge properties of the ink are reduced, and a landing position largely deviates when the discharge is performed after a pause period.

Here, the total volumes of the pigment particles and the polymer particles are measured as follows.

That is, plural operations such as ultracentrifugal separation, acid deposition, and concentration are selected and performed on the ink to separate the pigment particles and the polymer particles from the solid content in the ink.

The total volume of the pigment particles is obtained from the weight and the specific gravity of the separated pigment particles, and the total volume of the polymer particles is obtained from the weight and the specific gravity of the separated polymer particles.

Examples of the polymer particles include a styrene-acrylic acid copolymer, a styrene-acrylic acid-sodium acrylate copolymer, a styrene-butadiene copolymer, polystyrene, an acrylonitrile-butadiene copolymer, an acrylic ester copolymer, polyurethane, a silicon-acrylic acid copolymer, and particles (latex particles) of an acrylic modified fluororesin. As the polymer particles, core-shell type polymer particles in which compositions are different in a center portion and in an outer peripheral portion of the particle are also exemplified.

The polymer particles may be dispersed in the ink using an emulsifier, or may be dispersed in the ink without using an emulsifier.

Examples of the emulsifier include a surfactant and a polymer having a hydrophilic group such as a sulfonic acid group and a carboxyl group (for example, a polymer in which a hydrophilic group is grafted, and a polymer obtained from a hydrophilic monomer and a monomer having a hydrophobic portion).

The volume average particle diameter of the polymer particles may be 10 nm to 300 nm in view of the discharge properties of the ink and the forming properties of the polymer layer, and is more preferably 50 nm to 200 nm, and even more preferably 70 nm to 150 nm in view of the fact that the polymer particles are effectively disposed on the top of the pigment particles on the pressure-sensitive adhesive layer, and may form a polymer layer.

Here, the particle diameter of the polymer particles refers to a diameter of the polymer particle with an emulsifier attached thereto when the emulsifier is attached.

The volume average particle diameter of the polymer particles is measured by a Microtrac UPA particle size analyzer UPA-UT151 (manufactured by Microtrac). The measurement is performed by putting an ink diluted 1,000 times into a measurement cell. As input values at the time of the measurement, viscosity of the diluted solution of the ink is employed as the viscosity, and a refractive index of the polymer particles is employed as the particle refractive index.

Here, the polymer particles having the above-described volume average particle diameter may be prepared through any method. However, for example, the polymer particles may be prepared through the following emulsion polymerization method.

Specifically, an emulsion containing polymer particles having a controlled particle diameter is prepared through the emulsion polymerization method.

Specific processes of the emulsion polymerization method will be described as follows.

First, water, a protective colloid, and if necessary, an auxiliary emulsifier are put into a reactor, and the temperature is raised (in general, 65° C. to 90° C.). Then, apart of a polymerizable monomer component and a polymerization initiator are added to this reactor to perform initial polymerization.

Next, the residual polymerizable monomer component is added to the reactor at once or in a dropwise manner, and if necessary, polymerization is performed with further addition of the polymerization initiator. The particle diameter may be controlled by the progress of this polymerization.

At the time when the polymerization reaction is completed, the reactor is cooled, and an emulsion containing polymer particles having a target particle diameter is taken.

The emulsion containing polymer particles may be applied to the ink as is.

In this exemplary embodiment, a value (D1/D2) obtained by dividing a volume average particle diameter D1 of the pigment particles by a volume average particle diameter D2 of the polymer particles is preferably 0.5 to 2.0, more preferably 0.6 to 1.8, and even more preferably 0.7 to 1.6.

When the value (D1/D2) is within the above range, the polymer particles are effectively disposed on the top of the pigment particles on the pressure-sensitive adhesive layer, and thus the adhesive strength of an image formed of the pigment particles to a surface opposed to the image may be reduced.

The glass transition temperature of the polymer particles is preferably −20° C. to 80° C., and more preferably −10° C. to 60° C. in view of the abrasion resistance of the image.

The glass transition temperature of the polymer particles is obtained from a DSC curve obtained by differential scanning calorimetry (DSC). More specifically, the glass transition temperature is obtained through "extrapolated starting temperature of glass transition" described in the method of obtaining a glass transition temperature in JIS K 7121-1987 "testing methods for transition temperatures of plastics".

Regarding the content of the polymer particles, the total volume with respect to the total volume of the pigment particles may satisfy the above range.

The content based on the weight of the polymer particles is, for example, preferably 0.1% by weight to 5% by weight, and more preferably 0.5% by weight to 4.5% by weight with respect to the ink in view of discharge stability.

Water

Water will be described.

Examples of the water include ion exchanged water, ultra pure water, distilled water, and ultrafiltered water from the viewpoint of preventing, in particular, the mixing of impurities or the generation of microorganisms.

The content of the water is, for example, preferably 10% by weight to 95% by weight, and more preferably 30% by weight to 90% by weight with respect to the ink.

Water-Soluble Organic Solvent

A water-soluble organic solvent will be described.

Examples of the water-soluble organic solvent include polyols, derivatives of polyols, nitrogen-containing solvents, alcohols, and sulfur-containing solvents. As the water-soluble organic solvent, propylene carbonate and ethylene carbonate are also exemplified.

Examples of the polyols include sugar alcohols such as ethylene glycol, diethylene glycol, propylene glycol, butylene glycol, triethylene glycol, 1,5-pentanediol, 1,2-hexanediol, 1,2,6-hexanetriol, glycerin, trimethylolpropane, and xylitol; and saccharides such as xylose, glucose, and galactose.

Examples of the derivatives of polyols include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin.

Examples of the nitrogen-containing solvent include pyrrolidone, N-methyl-2-pyrrolidone, cyclohexylpyrrolidone, and triethanolamine.

Examples of the alcohols include ethanol, isopropyl alcohol, butyl alcohol, and benzyl alcohol.

Examples of the sulfur-containing solvent include thiodiethanol, thiodiglycerol, sulfolane, and dimethyl sulfoxide.

The water-soluble organic solvents may be used alone or in combination of two or more kinds.

The content of the water-soluble organic solvent is preferably 1% by weight to 60% by weight, and more preferably 1% by weight to 40% by weight with respect to the water.

Surfactant

In the ink according to this exemplary embodiment, a surfactant may be used in order to adjust a static surface tension, the range of variation of a dynamic surface tension, and a dynamic surface tension after 1 msec or 1 sec, which will be described later, to be within preferable ranges, respectively.

That is, in the ink according to this exemplary embodiment, the static surface tension, the range of variation of the dynamic surface tension, and the dynamic surface tension after 1 msec or 1 sec may be adjusted by the kind and the amount of the surfactant.

Examples of the surfactant include surfactants having a "hydrophile-lipophile balance" (HLB) of 14 or less.

For example, by adjusting the amount of the surfactant having a HLB of 14 or less, adjustment to a target static surface tension is easily performed. In addition, when plural surfactants having different HLBs are used among surfactants having a HLB of 14 or less, adjustment to a target dynamic surface tension is easily performed. Specifically, when a surfactant having a HLB of 9 to 14 and a surfactant having a HLB of 4 to 8 are used, adjustment to a target dynamic surface tension is easily performed.

The hydrophile-lipophile balance (HLB) is defined by the following expression (Griffin method).

HLB=20×(sum of formula weight of hydrophilic portion/molecular weight)

Examples of the surfactant include at least one selected from the group consisting of an ethylene oxide adduct of acetylene glycol and a polyether-modified silicone.

The ethylene oxide adduct of acetylene glycol is, for example, a compound having a —O—(CH$_2$CH$_2$O)$_n$—H structure (for example, n is an integer of 1 to 30) in which an ethylene oxide is added to at least one hydroxyl group of acetylene glycol. Examples of commercially available products of the ethylene oxide adduct of acetylene glycol (numerical values in the brackets indicate catalogue values of HLB) include Olfine E1004 (7 to 9), Olfine E1010 (13 to 14), Olfine EXP.4001 (8 to 11), Olfine EXP. 4123 (11 to 14), Olfine EXP. 4300 (10 to 13), Surfynol 104H (4), Surfynol 104PG-50 (4), Surfynol 420 (4), Surfynol 440 (4), and Dynol 604 (8) (all manufactured by Nissin Chemical Industry Co., Ltd.).

The content of the ethylene oxide adduct of acetylene glycol may be, for example, 0.01% by weight to 10% by weight, and is preferably 0.1% by weight to 5% by weight with respect to the ink.

The polyether-modified silicone is, for example, a compound in which a polyether group is coupled to a silicone chain (polysiloxane main chain) in a graft form or in a block form. Examples of the polyether group include a polyoxyethylene group and a polyoxypropylene group. The polyether group may be a polyoxyalkylene group in which an oxyethylene group and an oxypropylene group are added in a block form or randomly.

Examples of commercially available products of the polyether-modified silicone (numerical values in the brackets indicate catalogue values of HLB) include Silface SAG002 (12), Silface SAG503A (11), and Silface SAG005 (7) (all manufactured by Nissin Chemical Industry Co., Ltd.).

The content of the polyether-modified silicone may be, for example, 0.01% by weight to 5% by weight, and is preferably 0.05% by weight to 1% by weight with respect to the ink.

The ink according to this exemplary embodiment may contain other surfactants, other than the above-described ethylene oxide adduct of acetylene glycol and polyether-modified silicone.

Examples of other surfactants include an anionic surfactant, a non-ionic surfactant, a cationic surfactant, and an amphoteric surfactant, and an anionic surfactant and a non-ionic surfactant are preferable.

Examples of the anionic surfactant include alkylbenzene sulfonate, alkylphenyl sulfonate, alkylnaphthalene sulfonate, higher fatty acid salt, sulfate ester salt of higher fatty acid ester, sulfonate of higher fatty acid ester, sulfate ester salt and sulfonate of higher alcohol ether, higher alkyl sulfosuccinate, polyoxyethylene alkyl ether carboxylate, polyoxyethylene alkyl ether sulfate, alkyl phosphate, and polyoxyethylene alkyl ether phosphate.

Among these, the anionic surfactant may be dodecyl benzene sulfonate, isopropyl naphthalene sulfonate, monobutyl phenylphenol monosulfonate, monobutyl biphenyl sulfonate, or dibutyl phenylphenol disulfonate.

Examples of the non-ionic surfactant include polyoxyethylene alkyl ether, polyoxyethylene alkylphenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, sucrose fatty acid ester, polyoxyethylene alkyl amine, polyoxyethylene fatty acid amide, alkyl alkanolamide, polyethylene glycol polypropylene glycol block copolymer, and acetylene glycol.

Among these, the non-ionic surfactant may be polyoxyethylene nonylphenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylol amide, polyethylene glycol polypropylene glycol block copolymer, or acetylene glycol.

Examples of the non-ionic surfactant also include silicone surfactants such as a polysiloxane oxyethylene adduct; fluorine surfactants such as perfluoroalkyl carboxylate, perfluoroalkylsulfonate, and oxyethylene perfluoroalkyl ether; and biosurfactants such as spiculisporic acid, rhamnolipid, and lysolecithin.

The hydrophile-lipophile balance (HLB) of other surfactants may be, for example, in the range of 3 to 20 in consideration of solubility and the like.

Other surfactants may be used alone or in combination of two or more kinds.

The content of other surfactants is preferably 0.1% by weight to 10% by weight, more preferably 0.1% by weight to 5% by weight, and even more preferably 0.2% by weight to 3% by weight with respect to the ink.

Other Additives

Other additives will be described.

The ink may contain other additives.

Examples of other additives include an ink discharge improving agent (polyethyleneimine, polyamines, polyvinylpyrrolidone, polyethylene glycol, ethyl cellulose, carboxymethyl cellulose, and the like), a conductivity/pH adjusting agent (compounds of alkali metals such as potassium hydroxide, sodium hydroxide, and lithium hydroxide), a reactive diluting solvent, a penetrating agent, a pH buffer agent, an antioxidant, an antifungal agent, a viscosity adjusting agent, a conducting agent, a chelating agent, an ultraviolet absorbing agent, and an infrared absorbing agent.

Physical Properties of Ink

Preferable physical properties of the ink according to this exemplary embodiment will be described.

First, the ink according to this exemplary embodiment is preferably an ink having good wettability and spreadability on the pressure-sensitive adhesive layer in view of easy formation of the polymer layer. Therefore, the ink preferably has the following various surface tensions.

Various Surface Tensions

In the ink, the static surface tension is preferably 32 mN/m or less in view of good wettability and spreadability, and is preferably 21 mN/m to 30 mN/m in view of discharge stability.

Here, the static surface tension is a value measured under the environment of 23° C. and 55% RH using a Wilhelmy type surface tensiometer CBVP-Z (manufactured by Kyowa Interface Science Co., Ltd.).

In the ink, the dynamic surface tension after 10 msec, measured by a maximum bubble pressure method, is preferably 34 mN/m or less, more preferably 21 mN/m to 30 mN/m, and even more preferably 22 mN/m to 28 mN/m in view of ensuring wettability, spreadability, and a uniform film forming state in a short amount of time.

In the ink, the dynamic surface tension after 1 sec, measured by a maximum bubble pressure method, is preferably 32 mN/m or less, more preferably 21 mN/m to 30 mN/m, and even more preferably 22 mN/m to 28 mN/m in view of ensuring a uniform film forming state.

In the ink, when the dynamic surface tension is measured by a maximum bubble pressure method, the range of variation of the dynamic surface tension after from 10 msec to 1 sec is 0.2 mN/m to 2.0 mN/m, and is preferably 0.2 mN/m to 1.8 mN/m, and more preferably 0.2 mN/m to 1.5 mN/m in view of ensuring wettability, spreadability, and a uniform film forming state in a short amount of time.

The range of variation of the dynamic surface tension is a difference between a value of the dynamic surface tension after 10 msec and a value of the dynamic surface tension after 1 sec.

The dynamic surface tension is a value measured under the environment of 23° C. and 55% RH using a maximum bubble pressure method dynamic surface tension measuring device MPT-C (manufactured by Lauda Dr. R. Wobser GmbH & Co. KG).

The value of the dynamic surface tension after 10 msec is a value of the dynamic surface tension when the bubble pressure has reached the maximum 10 msec after a new interface is formed at a capillary tip. When the measurement limit of the maximum bubble pressure method dynamic surface tension measuring device is a dynamic surface tension after 10 msec, the value of the dynamic surface tension after 10 msec may be expressed as a dynamic surface tension after 0 msec. In this case, the value of the dynamic surface tension after 0 msec is employed as a value of the dynamic surface tension after 10 msec.

The value of the dynamic surface tension after 1 sec is a value of the dynamic surface tension when the bubble pressure has reached the maximum 1 sec after a new interface is formed at a capillary tip. When the measurement limit of the maximum bubble pressure method dynamic surface tension measuring device is a dynamic surface tension after a time period shorter than 1 sec, the value of the dynamic surface tension at the measurement limit is employed as a value of the dynamic surface tension after 1 sec. The reason for this is that the dynamic surface tension may be judged to be in a stable region when employing the value of the dynamic surface tension at the measurement limit.

pH

The pH of the ink is preferably in the range of 4 to 10, and more preferably in the range of 5 to 9.

Here, as the pH of the ink, a value measured by a pH/conductivity meter (MPC227 manufactured by Mettler-Toledo International Inc.) under the environment of a temperature of 23±0.5° C. and a humidity of 55±5% RH is employed.

Conductivity

The conductivity of the ink is, for example, in the range of 0.01 S/m to 0.5 S/m (preferably in the range of 0.01 S/m to 0.25 S/m, and more preferably in the range of 0.01 S/m to 0.20 S/m).

The conductivity is measured by MPC227 (pH/conductivity meter, manufactured by Mettler-Toledo International Inc.).

Viscosity

The viscosity of the ink is, for example, in the range of 1.5 mPa·s to 30 mPa·s (preferably in the range of 1.5 mPa·s to 20 mPa·s).

The viscosity is measured under the conditions of a measurement temperature of 23° C. and a shear velocity of 1,400 $s^{-1}$ using TV-20 (manufactured by Toki Sangyo Co., Ltd.) as a measuring device.

Here, the ink according to this exemplary embodiment may be, for example, any one of a black ink, a cyan ink, a magenta ink, a yellow ink, and a neutral color ink other than the above colors.

In addition, the ink according to this exemplary embodiment may be used as an ink set including at least one of the inks (preferably composed of the inks according to this exemplary embodiment).

Recording Device/Recording Method

A recording device according to this exemplary embodiment is provided with discharge heads which discharge the ink according to this exemplary embodiment on a recording medium. According to the recording device according to this exemplary embodiment, a recording method having a discharge process of discharging the ink according to this exemplary embodiment on a recording medium is provided.

The recording device according to this exemplary embodiment may be further provided with a drying device which dries the ink discharged on a recording medium. In the recording device further provided with a drying device, a recording method further having a drying process of drying the ink discharged on a recording medium is provided.

By drying the ink discharged on the recording medium with the drying device (drying process), high-speed recording is provided.

Here, the recording medium used in the recording device and the recording method according to this exemplary embodiment is not particularly limited, but examples thereof include ink-permeable recording mediums such as plain paper and a recording sheet provided with an ink receiving layer; non-ink-permeable recording mediums such as coated paper and a resin film; and pressure bonding paper for ink jet recording provided with a pressure-sensitive adhesive layer, other than the above recording mediums.

A recording device and a recording method when using, as a recording medium, pressure bonding paper for ink jet recording provided with a pressure-sensitive adhesive layer will be taken as an example and described below.

The recording device according to this exemplary embodiment may be provided with an ink cartridge (cartridge according to this exemplary embodiment) which stores the ink according to this exemplary embodiment and is formed into a cartridge to be detachable from on the recording device.

Hereinafter, an example of the recording device and the recording method according to this exemplary embodiment will be described with reference to the drawing.

FIG. 1 is a schematic diagram illustrating the recording device according to this exemplary embodiment.

A recording device 10 according to this exemplary embodiment is a recording device which records an image by discharging an ink on continuous paper (pressure bonding paper for ink jet recording) P provided with a pressure-sensitive adhesive layer on a base.

The recording device 10 is provided with discharge heads 122 (discharge device 121 having discharge heads 122) which discharge an ink on a pressure-sensitive adhesive layer of continuous paper P.

In the recording device 10 according to this exemplary embodiment, a recording method having a discharge process of discharging an ink on a pressure-sensitive adhesive layer of continuous paper P is provided. Accordingly, an ink image is recorded on the pressure-sensitive adhesive layer of the continuous paper P.

More specifically, the recording device 10 according to this exemplary embodiment is provided with an image recording unit 12 which records an image on the pressure-sensitive adhesive layer of the continuous paper P.

The recording device 10 is provided with a preprocessing unit 14 which stores the continuous paper P to be supplied to the image recording unit 12, and a buffer unit 16 which adjusts a transport amount of the continuous paper P to be supplied from the preprocessing unit 14 to the image recording unit 12. The buffer unit 16 is disposed between the image recording unit 12 and the preprocessing unit 14.

The recording device 10 is provided with, for example, a postprocessing unit 18 which stores the continuous paper P discharged from the image recording unit 12, and a buffer unit 20 which adjusts a transport amount of the continuous paper P discharged from the image recording unit 12 to the postprocessing unit 18. The buffer unit 20 is disposed between the image recording unit 12 and the postprocessing unit 18.

The recording device 10 is provided with a cooling unit 22 which is disposed between the image recording unit 12 and the buffer unit 20, and cools the continuous paper P discharged from the image recording unit 12.

The image recording unit 12 is provided with, for example, roll members (reference numerals are omitted) which guide the continuous paper P along a transporting path 124 of the continuous paper P, and the discharge device 121 which records an image by discharging an ink (ink droplets) to the continuous paper P transported along the transporting path 124 of the continuous paper P.

The discharge device 121 is provided with the discharge heads 122 each discharging an ink to the continuous paper P. The discharge heads 122 are, for example, long recording heads of which the effective recording region (region where a nozzle which discharges an ink is disposed) has a size equal to or longer than the width of the continuous paper P (length of the continuous paper P in a direction intersecting (for example, perpendicular to) the transporting direction).

The discharge heads 122 are not limited thereto, but may be discharge heads shorter than the width of the continuous paper P, and may be discharge heads of a type discharging an ink while moving in the width direction of the continuous paper P (so-called carriage type).

The discharge heads 122 may be of a so-called thermal type discharging ink droplets by heat, or may be of a so-called piezoelectric type discharging ink droplets by pressure, and known discharge heads are applied.

The discharge heads 122 have, for example, a discharge head 122K which records a K (black) image by discharging an ink to the continuous paper P, a discharge head 122Y which records a Y (yellow) image, a discharge head 122M which records an M (magenta) image, and a discharge head 122C which records a C (cyan) image. Also, the discharge head 122K, the discharge head 122Y, the discharge head 122M, and the discharge head 122C are arranged in a line to be opposed to the continuous paper P from the upstream side to the downstream side in the transporting direction of the continuous paper P (hereinafter, may be simply referred to as "paper transporting direction") in this order. In addition, in the description of the discharge heads, when K, Y, M, and C are not distinguished, K, Y, M, and C added to the reference numerals are omitted.

The discharge heads 122K, 122Y, 122M, and 122C are respectively connected to ink cartridges 123K, 123Y, 123M, and 123C of the respective colors is detachable from the recording device 10 via supply pipes (not shown), and by the ink cartridges 123, the inks of the respective colors are supplied to the discharge heads 122, respectively.

Here, at least one of the inks stored in the ink cartridges 123K, 123Y, 123M, and 123C of the respective colors may be the above-described ink according to this exemplary embodiment, but all of the inks are preferably the inks according to this exemplary embodiment.

The discharge heads 122 are not limited to a form in which four discharge heads 122 corresponding to the four colors are disposed, and four or more discharge heads 122 corresponding to four or more colors including other neutral colors may be disposed according to the purpose.

Here, the discharge heads 122 may be provided with, for example, any one of a low resolution discharge head 122 (for example, ejection head of 600 dpi) which discharges an ink in an ink droplet amount of 1 pl to 15 pl, and a high resolution discharge head 122 (for example, ejection head of 1,200 dpi) which discharges an ink in an ink droplet amount of less than 10 pl. In addition, the discharge device 121 may be provided with both of the low resolution discharge head 122 and the high resolution discharge head 122. The ink droplet amount of the discharge head 122 is in the range of the maximum ink droplet amount. In addition, "dpi" means "dots per inch".

In the discharge device 121, for example, a drying drum 126 (an example of drying device) on which a rear surface of the continuous paper P is wound, and which dries the image (ink) on the continuous paper P while being driven and rotated in contact with the transported continuous paper P is disposed on the downstream side of the discharge heads 122 in the paper transporting direction.

In the drying drum 126, a built-in heating source (for example, halogen heater: not shown) is formed. The drying drum 126 dries the image (ink) on the continuous paper P through heating using the heating source.

Hot air blowers 128 (an example of drying device) which dry the image (ink) on the continuous paper P are disposed around the drying drum 126. The image (ink) on the continuous paper P wound on the drying drum 126 is dried by hot air obtained by the hot air blower 128.

Here, in the discharge device 121, other drying devices such as a near infrared ray heater (not shown) which dries the image (ink) on the continuous paper P, and a laser irradiation device may be disposed on the downstream side of the discharge heads 122 in the paper transporting direction. Other drying devices such as a near infrared ray heater and a laser irradiation device are disposed in place of at least one of the drying drum 126 and the hot air blower 128, or in addition of the drying drum 126 and the hot air blower 128.

In view of the film formability of the polymer particles in the ink and of easy formation of a film which is formed by fusion of the polymer particles, drying by heating with a heating source, and drying using a near infrared ray heater are preferable as the drying device.

The preprocessing unit 14 is provided with a supply roll 14A around which the continuous paper P to be supplied to the image recording unit 12 is wound, and this supply roll 14A is rotatably supported by a frame member (not shown).

In the buffer unit 16, for example, a first pass roller 16A, a dancer roller 16B, and a second pass roller 16C are disposed in the paper transporting direction. While moving in the vertical direction in FIG. 1, the dancer roller 16B adjusts a tension of the continuous paper P transported to the image recording unit 12, and adjusts a transport amount of the continuous paper P.

The postprocessing unit 18 is provided with a winding roll 18A as an example of a transporting portion which winds the continuous paper P on which an image is recorded. The winding roll 18A is rotated by receiving torque from a motor (not shown) to transport the continuous paper P along the transporting path 124.

In the buffer unit 20, for example, a first pass roller 20A, a dancer roller 20B, and a second pass roller 20C are disposed in the paper transporting direction. While moving in the vertical direction in FIG. 1, the dancer roller 20B adjusts a tension of the continuous paper P to be discharged to the postprocessing unit 18, and adjusts a transport amount of the continuous paper P.

In the cooling unit 22, plural cooling rollers 22A are disposed. The continuous paper P is cooled by being transported between the plural cooling rollers 22A.

Next, the operation (recording method) of the recording device 10 according to this exemplary embodiment will be described.

In the recording device 10 according to this exemplary embodiment, first, continuous paper P is transported from the supply roll 14A of the preprocessing unit 14 to the image recording unit 12 through the buffer unit 16.

Next, in the image recording unit 12, an ink is discharged from the respective discharge heads 122 of the discharge device 121 to the pressure-sensitive adhesive layer of the continuous paper P. Accordingly, an ink image is recorded on the pressure-sensitive adhesive layer of the continuous paper P. Thereafter, the drying drum 126 dries the image (ink) on the continuous paper P from the rear surface side (a surface on the side opposite to the recording surface) of the continuous paper P. The hot air blower 128 dries the ink (image) discharged to the continuous paper P from the surface side (recording surface) of the continuous paper P. That is, the drying drum 126 and the hot air blower 128 dry the ink discharged on the continuous paper P.

Next, in the cooling unit 22, the continuous paper P on which the image is recorded is cooled by the cooling rollers 22A.

Next, through the buffer unit 16, the postprocessing unit 18 winds the continuous paper P, on which the image is recorded, by the winding roll 18A.

Through the processes described above an ink image is recorded on the pressure-sensitive adhesive layer of the continuous paper P which is pressure bonding paper.

The continuous paper P having an image recorded thereon as described above is cut into a target size (for example, such a size that it has a postcard size when being folded in two or three) through a cutting process.

The cut pressure bonding paper is folded in two or three, and then the surfaces thereof opposed to each other are pressure-bonded.

A known pressure bonding device (laminator) is applied to the pressure bonding.

The above-described cutting and pressure bonding may be performed by a known mail sealer.

Pressure bonding conditions may be determined according to the used pressure bonding paper and the release strength when the pressure-bonded portion is detached. The release strength may be in the range of 300 gf to 800 gf in the case of a crimped postcard.

In the recording device 10 according to this exemplary embodiment, the method of directly discharging ink droplets on a surface of continuous paper P by the discharge device 121 (discharge heads 122) is described, but the invention is not limited thereto. For example, a method including: discharging ink droplets to an intermediate transfer member; and transferring the ink droplets on the intermediate transfer member to the continuous paper P may be employed.

In addition, in the recording device 10 according to this exemplary embodiment, the method of recording an image by discharging an ink to roll-shaped continuous paper P is described. However, for example, a method of recording an image by discharging an ink to a sheet having a target size may be employed.

The pressure bonding paper applied to the recording device (and recording method) according to this exemplary embodiment may be pressure bonding paper for ink jet recording, that is, pressure bonding paper provided with a pressure-sensitive adhesive layer also serving as an ink receiving layer. As described above, the pressure bonding paper may have a form of continuous paper such as roll-form paper or continuous document paper, or may be sheets of paper previously cut into a target size.

Specific examples of the pressure bonding paper include ink jet pressure bonding paper (IJ•P Mail N, IJ•W Mail PN, and IJ•W Mail P) manufactured by Hokuetsu Kishu Paper Co., Ltd., and ink jet pressure bonding paper (Bright Mail IJ) manufactured by Daio Paper Corporation.

In addition, it is obvious that this exemplary embodiment is not restrictively construed, but is provided in such a scope that the requirements of the invention are satisfied.

EXAMPLES

Hereinafter, the invention will be described in more detail with examples, but the invention is not limited to these examples.

Example 1

Preparation of Ink 1

Carbon Black (Mogul L: manufactured by Cabot Corporation, pigment particles): 5% by weight Sodium-Neutralized Product of Styrene/Acrylic Acid Copolymer (water-soluble resin, weight average molecular weight=30,000): 2.5% by weight KE-106E (manufactured by Seiko PMC Corporation) (styrene-acrylic emulsion; polymer particles, glass transition temperature=16° C.): 0.8% by weight (solid content)

Glycerin: 10% by weight

Diethylene Glycol: 10% by weight

Surfactant (Olefin E1010 manufactured by Nissin Chemical Industry Co., Ltd.): 4% by weight Surfactant (Surfynol 104PG-50 manufactured by Nissin Chemical Industry Co., Ltd.): 1% by weight Ion Exchanged Water: remainder The components are mixed, and then the mixture is filtered with a filter having a pore size of 5 μm to obtain an ink 1.

Example 2

Preparation of Ink 2

Carbon Black (Mogul L: manufactured by Cabot Corporation, pigment particles): 5% by weight Sodium-Neutralized Product of Styrene/Acrylic Acid Copolymer (water-soluble resin, weight average molecular weight=30,000): 2.5% by weight KE-106E (manufactured by Seiko PMC Corporation) (styrene-acrylic emulsion; polymer particles, glass transition temperature=16° C.): 1.9% by weight (solid content)

Glycerin: 10% by weight

Diethylene Glycol: 10% by weight

Surfactant (Olefin E1010 manufactured by Nissin Chemical Industry Co., Ltd.): 4% by weight Surfactant (Surfynol 104PG-50 manufactured by Nissin Chemical Industry Co., Ltd.): 1% by weight Ion Exchanged Water: remainder The components are mixed, and then the mixture is filtered with a filter having a pore size of 5 μm to obtain an ink 2.

Example 3

Preparation of Ink 3

Carbon Black (Mogul L: manufactured by Cabot Corporation, pigment particles): 5% by weight Sodium-Neutralized Product of Styrene/Acrylic Acid Copolymer (water-soluble resin, weight average molecular weight=30,000): 2.5% by weight TOCRYL W-4627 (manufactured by Toyo Chem Co., Ltd.) (acrylic emulsion; polymer particles, glass transition temperature=45° C.): 1.9% by weight (solid content)

Glycerin: 10% by weight

Diethylene Glycol: 10% by weight

Surfactant (Olefin E1010 manufactured by Nissin Chemical Industry Co., Ltd.): 4% by weight Surfactant (Surfynol 104PG-50 manufactured by Nissin Chemical Industry Co., Ltd.): 1% by weight Ion Exchanged Water: remainder The components are mixed, and then the mixture is filtered with a filter having a pore size of 5 μm to obtain an ink 3.

Example 4

Preparation of Ink 4

Carbon Black (Mogul L: manufactured by Cabot Corporation, pigment particles): 5% by weight Sodium-Neutralized Product of Styrene/Acrylic Acid Copolymer (water-soluble resin, weight average molecular weight=30,000): 2.5% by weight JE-1053 (manufactured by Seiko PMC Corporation) (styrene-acrylic emulsion; polymer particles, glass transition temperature=82° C.): 2.8% by weight (solid content)

Glycerin: 10% by weight

Diethylene Glycol: 10% by weight

Surfactant (Olefin E1010 manufactured by Nissin Chemical Industry Co., Ltd.): 4% by weight Surfactant (Surfynol 104PG-50 manufactured by Nissin Chemical Industry Co., Ltd.): 1% by weight Ion Exchanged Water: remainder The components are mixed, and then the mixture is filtered with a 5 μm filter having a pore size of 5 μm to obtain an ink 4.

Example 5

Preparation of Ink 5

Carbon Black (Mogul L: manufactured by Cabot Corporation, pigment particles): 5% by weight Sodium-Neutralized Product of Styrene/Acrylic Acid Copolymer (water-soluble resin, weight average molecular weight=30,000): 2.5% by weight Uprene UXA-307 (manufactured by Sanyo Chemical Industries, Ltd.) (emulsion of urethane resin; polymer particles): 4.4% by weight (solid content)

Glycerin: 10% by weight

Diethylene Glycol: 10% by weight

Surfactant (Olefin E1010 manufactured by Nissin Chemical Industry Co., Ltd.): 4% by weight Surfactant (Surfynol 104PG-50 manufactured by Nissin Chemical Industry Co., Ltd.): 1% by weight Ion Exchanged Water: remainder The components are mixed, and then the mixture is filtered with a filter having a pore size of 5 μm to obtain an ink 5.

Example 6

Preparation of Ink 6

Carbon Black (Mogul L: manufactured by Cabot Corporation, pigment particles): 5% by weight Sodium-Neutralized Product of Styrene/Acrylic Acid Copolymer (water-soluble resin, weight average molecular weight=30,000): 2.5% by weight BE-7350 (manufactured by Seiko PMC Corporation) (vinyl chloride-acrylic emulsion; polymer particles, glass transition temperature=24° C.): 1.9% by weight (solid content)

Glycerin: 10% by weight

Diethylene Glycol: 10% by weight

Surfactant (Olefin E1010 manufactured by Nissin Chemical Industry Co., Ltd.): 4% by weight Surfactant (Surfynol 104PG-50 manufactured by Nissin Chemical Industry Co., Ltd.): 1% by weight Ion Exchanged Water: remainder The components are mixed, and then the mixture is filtered with a filter having a pore size of 5 μm to obtain an ink 6.

Example 7

Preparation of Ink 7

Carbon Black (Mogul L: manufactured by Cabot Corporation, pigment particles): 5% by weight Sodium-Neutralized Product of Styrene/Acrylic Acid Copolymer (water-soluble resin, weight average molecular weight=30,000): 2.5% by weight JE-1053 (manufactured by Seiko PMC Corporation) (styrene-acrylic emulsion; polymer particles, glass transition temperature=82° C.): 4.1% by weight (solid content)

Glycerin: 10% by weight

Diethylene Glycol: 10% by weight

Surfactant (Olefin E1010 manufactured by Nissin Chemical Industry Co., Ltd.): 4% by weight Surfactant (Surfynol 104PG-50 manufactured by Nissin Chemical Industry Co., Ltd.): 1% by weight Ion Exchanged Water: remainder The components are mixed, and then the mixture is filtered with a filter having a pore size of 5 μm to obtain an ink 7.

Example 8

Preparation of Ink 8

Carbon Black (Mogul L: manufactured by Cabot Corporation, pigment particles): 5% by weight Sodium-Neutralized Product of Styrene/Acrylic Acid Copolymer (water-soluble resin, weight average molecular weight=30,000): 2.5% by weight Permarin UA-368T (manufactured by Sanyo Chemical Industries, Ltd.) (urethane emulsion; polymer particles): 4.1% by weight (solid content)

Glycerin: 10% by weight

Diethylene Glycol: 10% by weight

Surfactant (Olefin E1010 manufactured by Nissin Chemical Industry Co., Ltd.): 4% by weight Surfactant (Surfynol 104PG-50 manufactured by Nissin Chemical Industry Co., Ltd.): 1% by weight Ion Exchanged Water: remainder The components are mixed, and then the mixture is filtered with a filter having a pore size of 5 μm to obtain an ink 8.

Example 9

Preparation of Ink 9

Carbon Black (Mogul L: manufactured by Cabot Corporation, pigment particles): 5% by weight Sodium-Neutralized Product of Styrene/Acrylic Acid Copolymer (water-soluble resin, weight average molecular weight=30,000): 2.5% by weight QE-1042 (manufactured by Seiko PMC Corporation) (styrene-acrylic emulsion; polymer particles, glass transition temperature=53° C.): 1.9% by weight (solid content)

Glycerin: 10% by weight

Diethylene Glycol: 10% by weight

Surfactant (Olefin E1010 manufactured by Nissin Chemical Industry Co., Ltd.): 4% by weight Surfactant (Surfynol 104PG-50 manufactured by Nissin Chemical Industry Co., Ltd.): 1% by weight Ion Exchanged Water: remainder The components are mixed, and then the mixture is filtered with a filter having a pore size of 5 μm to obtain an ink 9.

Example 10

Preparation of Ink 10

Carbon Black (MA-100: manufactured by Mitsubishi Chemical Corporation, pigment particles): 5% by weight Sodium-Neutralized Product of Styrene/Acrylic Acid Copolymer (water-soluble resin, weight average molecular weight=30,000): 2.5% by weight QE-1042 (manufactured by Seiko PMC Corporation) (styrene-acrylic emulsion; polymer particles, glass transition temperature=53° C.): 1.9% by weight (solid content)

Glycerin: 10% by weight

Diethylene Glycol: 10% by weight

Surfactant (Olefin E1010 manufactured by Nissin Chemical Industry Co., Ltd.): 4% by weight Surfactant (Surfynol 104PG-50 manufactured by Nissin Chemical Industry Co., Ltd.): 1% by weight Ion Exchanged Water: remainder The components are mixed, and then the mixture is filtered with a filter having a pore size of 5 μm to obtain an ink 10.

Comparative Example 1

Preparation of Ink C1

Carbon Black (Mogul L: manufactured by Cabot Corporation, pigment particles): 5% by weight Sodium-Neutralized Product of Styrene/Acrylic Acid Copolymer (water-soluble resin, weight average molecular weight=30,000): 2.5% by weight UE-1055 (manufactured by Seiko PMC Corporation) (styrene-acrylic emulsion; polymer particles, glass transition temperature=15° C.): 5.0% by weight (solid content)

Glycerin: 10% by weight

Diethylene Glycol: 10% by weight

Surfactant (Olefin E1010 manufactured by Nissin Chemical Industry Co., Ltd.): 4% by weight Surfactant (Surfynol 104PG-50 manufactured by Nissin Chemical Industry Co., Ltd.): 1% by weight Ion Exchanged Water: remainder The components are mixed, and then the mixture is filtered with a filter having a pore size of 5 μm to obtain an ink C1.

Comparative Example 2

Preparation of Ink C2

Carbon Black (Mogul L: manufactured by Cabot Corporation, pigment particles): 5% by weight Sodium-Neutralized Product of Styrene/Acrylic Acid Copolymer (water-soluble resin, weight average molecular weight=30,000): 2.5% by weight UE-1055 (manufactured by Seiko PMC Corporation) (styrene-acrylic emulsion; polymer particles, glass transition temperature=15° C.): 0.6% by weight (solid content)

Glycerin: 10% by weight

Diethylene Glycol: 10% by weight

Surfactant (Olefin E1010 manufactured by Nissin Chemical Industry Co., Ltd.): 4% by weight Surfactant (Surfynol 104PG-50 manufactured by Nissin Chemical Industry Co., Ltd.): 1% by weight Ion Exchanged Water: remainder The components are mixed, and then the mixture is filtered with a filter having a pore size of 5 μm to obtain an ink C2.

Measurement of Physical Properties

Total volumes of pigment particles and polymer particles of each of the inks obtained as described above are measured as described above, and a ratio of the total volume of the polymer particles when the total volume of the pigment particles is 1 (shown as "volume ratio" in Table 1) is calculated.

In addition, volume average particle diameters of the pigment particles and the polymer particles of each ink (shown as "particle diameter" in Table 1) are measured as described above. Based on the measured values, a value (D1/D2) which is obtained by dividing a volume average particle diameter D1 of the pigment particles by a volume average particle diameter D2 of the polymer particles (shown as "particle diameter ratio" in Table 1) is calculated.

Regarding each ink, a static surface tension, dynamic surface tensions after 10 msec and 1 sec, and the range of variation of a dynamic surface tension are measured through the above-described methods, respectively.

The results are shown in Table 1.

Evaluations

Preparation of Recording Device

A recording device having the same configuration as that shown in FIG. 1 and provided with a piezoelectric head of 600 dpi (maximum ink droplet amount of 11 pl) as an ink discharge head is prepared.

As a recording medium (continuous paper P) to be applied to the recording device, the following pressure bonding paper is used.

Here, details of the recording device are as follows.

—Details of Recording Device—

Recording Speed (recording medium transport speed): 25 m/min

Set Temperature of Drying Drum: 100° C.

Set Temperature of Hot Air Blower: 100° C.

Continuous Paper (pressure bonding paper): IJ•W Mail PN (ink jet pressure bonding paper manufactured by Hokuetsu Kishu Paper Co., Ltd.)

The recording device is filled with the above-described ink.

The following evaluations are performed using this recording device.

Evaluation of Image Transfer Degree

Using each recording device, an ink is discharged on a pressure-sensitive adhesive layer of pressure bonding paper: IJ•W Mail PN from a piezoelectric head of 600 dpi (maximum ink droplet amount of 11 pl) to record a solid image of 1.5 cm×1.5 cm and an image of letters and ruled lines. Then, the images are dried by the drying drum and the hot air blower, and are cooled by the cooling rollers. Through the processes, an ink image is recorded on the pressure-sensitive adhesive layer (drying by heating is performed).

The pressure bonding paper on which the image is recorded is cut into such a size that it has a postcard size when being folded in three.

Then, the cut sample is allowed to stand for one night, and then pressure-bonded. The pressure bonding is performed under such a condition that the peeling strength at the time of detachment after the pressure bonding is 500 gf.

Thereafter, the pressure-bonded portion subjected to the pressure bonding is opened (detached), and a degree of the transfer of the image to a surface opposed to the image is visually evaluated.

Criteria for evaluating the transfer degree are as follows. The results are shown in the following Table 1.

Image Transfer Degree

A: The transfer of the solid image portion is not observed, and the letters and the ruled lines are hardly transferred.

B: The transfer of the solid image portion is not observed, and the transfer of the letters and the ruled lines is observed, but is relatively small.

C: The transfer of the solid image portion, the letters, and the ruled lines is observed, but a printing portion of a surface opposed thereto may be read (available for practical use).

D: The transfer of the solid image portion, the letters, and the ruled lines is considerable, and affects the reading of a printing portion of a surface opposed thereto.

Evaluation of Deviation of Landing Position

Using each recording device, an ink of 5 pl is discharged at a recording speed of 50 m/min on a pressure-sensitive adhesive layer of pressure bonding paper: IJ•W Mail PN from a piezoelectric head of 600 dpi (maximum ink droplet amount of 11 pl).

After a pause period of 0.36 seconds from the previous ink discharge, an amount of the deviation of a landing position when the next ink discharge is performed is measured. The pause period of the ink discharge may be appropriately adjusted according to the recording speed and the length (length in recording medium transporting direction) of a non-discharge portion (region where no image is formed, that is, non-image portion).

Specifically, a degree of a deviation of a distance between one reference dotted line recorded immediately after the recording of a solid image and one dotted line (one dotted line recorded after a pause period of 0.36 seconds) recorded immediately after a non-image portion of approximately 12 inches is made in the recording medium transporting direction after the recording of the solid image with respect to the length of the non-image portion corresponding to the pause period of 0.36 seconds is measured, and the measured value is designated as an amount of the deviation of the landing position.

Criteria for evaluating the deviation of the landing position are as follows. The results are shown in Table 1.

Deviation of Landing Position

A: The amount of the deviation of the landing position is 22 μm or less.

B: The amount of the deviation of the landing position is greater than 22 μm to 43 μm.

C: The amount of the deviation of the landing position is greater than 43 μm.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Ink No. | | 1 | 2 | 3 | 4 | 5 | 6 | 7 | 8 | 9 | 10 |
| Volume Ratio | | 0.3 | 0.7 | 0.7 | 1.0 | 1.6 | 0.7 | 1.5 | 1.5 | 0.7 | 1.0 |
| Particle Diameter of Pigment Particles (nm) | | 95 | 95 | 95 | 95 | 95 | 95 | 95 | 95 | 95 | 90 |
| Particle Diameter of Polymer Particles (nm) | | 80 | 80 | 120 | 50 | 200 | 48 | 50 | 210 | 40 | 50 |
| Particle Diameter Ratio | | 1.2 | 1.2 | 0.8 | 1.9 | 0.5 | 2.0 | 1.9 | 0.5 | 2.4 | 1.8 |
| Static Surface Tension (mN/m) | | 25 | 26 | 26 | 27 | 28 | 26 | 27 | 27 | 26 | 27 |
| Dynamic Surface Tension (mN/m) | 10 msec | 28 | 28 | 28 | 30 | 30 | 28 | 30 | 30 | 28 | 29 |
| | 1 sec | 26 | 27 | 27 | 28 | 28 | 26 | 28 | 28 | 27 | 27 |
| | Range of Variation | 2 | 1 | 1 | 2 | 2 | 2 | 2 | 2 | 1 | 2 |
| Evaluation | Transfer Degree | B | A | A | A | A | C | A | B | C | A |
| | Deviation of Landing Position | A | A | A | B | B | A | B | B | A | B |

| | | Comparative Example 1 | Comparative Example 2 |
|---|---|---|---|
| Ink No. | | C1 | C2 |
| Volume Ratio | | 1.8 | 0.2 |
| Particle Diameter of Pigment Particles (nm) | | 95 | 95 |
| Particle Diameter of Polymer Particles (nm) | | 100 | 100 |
| Particle Diameter Ratio | | 1.0 | 1.0 |
| Static Surface Tension (mN/m) | | 28 | 25 |

TABLE 1-continued

| | | | |
|---|---|---|---|
| Dynamic Surface Tension (mN/m) | 10 msec | 30 | 28 |
| | 1 sec | 29 | 26 |
| | Range of Variation | 1 | 2 |
| Evaluation | Transfer Degree | A | D |
| | Deviation of Landing Position | C | A |

From the results, the images recorded with the inks of the examples on the pressure-sensitive adhesive layer of the pressure bonding paper are found to be prevented from being transferred to a surface opposed thereto after the pressure bonding and detachment, compared to the image recorded with the ink of Comparative Example 2.

In addition, the inks of the examples are found to be reduced in terms of the deviation of the landing position when being discharged after a pause period of 0.36 seconds, compared to the ink of Comparative Example 1.

From the results, the images recorded with the inks of the examples are found to be prevented from being transferred to an object coming into contact therewith (surface opposed thereto) even after undergoing severe conditions including pressure bonding and detachment. Therefore, the images recorded with the inks of the examples are thought to be prevented from being transferred to an object coming into contact with the images regardless of the kind of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An ink comprising:
   pigment particles;
   polymer particles in such an amount that a total volume of all of the polymer particles in the ink is from 0.3 to 1.6 when a total volume of all of the pigment particles in the ink is taken as 1;
   water; and
   an aqueous organic solvent.

2. The ink according to claim 1,
   wherein the polymer particles have a volume average particle diameter of 50 nm to 200 nm.

3. The ink according to claim 2,
   wherein a value obtained by dividing a volume average particle diameter of the pigment particles by a volume average particle diameter of the polymer particles is from 0.5 to 2.0.

4. The ink according to claim 1,
   wherein a value obtained by dividing a volume average particle diameter of the pigment particles by a volume average particle diameter of the polymer particles is from 0.5 to 2.0.

5. A recording device comprising:
   a discharge head that discharges the ink according to claim 1 on a recording medium.

6. The recording device according to claim 5, further comprising:
   a drying device that dries the ink discharged on the recording medium.

7. The recording device according to claim 6,
   wherein the recording medium is pressure bonding paper for ink jet recording provided with a pressure-sensitive adhesive layer.

8. The recording device according to claim 5,
   wherein the recording medium is pressure bonding paper for ink jet recording provided with a pressure-sensitive adhesive layer.

9. A recording method comprising:
   discharging the ink according to claim 1 on a recording medium.

10. The recording method according to claim 9, further comprising:
    drying the ink discharged on the recording medium.

11. The recording method according to claim 10,
    wherein the recording medium is pressure bonding paper for ink jet recording provided with a pressure-sensitive adhesive layer.

12. The recording method according to claim 9,
    wherein the recording medium is pressure bonding paper for ink jet recording provided with a pressure-sensitive adhesive layer.

13. The ink according to claim 1, wherein the total volume of the pigment particles is obtained from the weight and the specific gravity of separated pigment particles, and the total volume of the polymer particles is obtained from the weight and the specific gravity of separated polymer particles.

14. The ink according to claim 1, wherein the dynamic surface tension after 10 msec, measured by a maximum bubble pressure method, is 34 mN/m or less.

15. The ink according to claim 1,
    wherein the pigment particles have a volume average particle diameter of 500 nm to 1000 nm.

* * * * *